(12) United States Patent
Radtke (10) Patent No.: US 12,138,818 B2
(45) Date of Patent: Nov. 12, 2024

(54) INTERNAL GRADIENT MATERIALS, IMPLEMENTS AND METHODS

(71) Applicant: VERD STEEL, INC., Katy, TX (US)

(72) Inventor: Corey W. Radtke, Katy, TX (US)

(73) Assignee: VERD STEEL, INC., Katy, TX (US)

( * ) Notice: Subject to any disclaimer, the term of this patent is extended or adjusted under 35 U.S.C. 154(b) by 531 days.

(21) Appl. No.: 17/423,417

(22) PCT Filed: Jan. 23, 2020

(86) PCT No.: PCT/US2020/014719
§ 371 (c)(1),
(2) Date: Jul. 15, 2021

(87) PCT Pub. No.: WO2020/154464
PCT Pub. Date: Jul. 30, 2020

(65) Prior Publication Data
US 2022/0088807 A1    Mar. 24, 2022

Related U.S. Application Data (60) Provisional application No. 62/795,893, filed on Jan. 23, 2019.

(51) Int. Cl.
*B26B 9/00* (2006.01)
*B23K 20/02* (2006.01)
*B32B 15/01* (2006.01)
*B23K 103/04* (2006.01)
*C22C 38/00* (2006.01)

(52) U.S. Cl.
CPC ............. *B26B 9/00* (2013.01); *B23K 20/02* (2013.01); *B32B 15/011* (2013.01); *B23K 2103/04* (2018.08); *C22C 38/00* (2013.01); *Y10T 428/12458* (2015.01)

(58) Field of Classification Search
None
See application file for complete search history.

(56) References Cited

U.S. PATENT DOCUMENTS

| | | | |
|---|---|---|---|
| 2,335,249 A | 11/1943 | Hawkins | |
| 2,438,759 A * | 3/1948 | Liebowitz | F41H 5/045 428/614 |
| 3,668,755 A * | 6/1972 | Larsen | H01H 1/0231 228/234.1 |
| 6,207,294 B1 | 3/2001 | Rutter | |

(Continued)

FOREIGN PATENT DOCUMENTS

| | | |
|---|---|---|
| DE | 102012017150 A1 | 3/2014 |
| JP | 05220583 A * | 8/1993 |

(Continued)

*Primary Examiner* — Seth Dumbris
(74) *Attorney, Agent, or Firm* — Douglas Denninger (57) ABSTRACT

An implement including a first plate and a second plate, each plate having a contact surface which abuts a contact surface of the other plate to establish an interface plane, and a gradient of at least one additive that is more concentrated at the interface plane and less concentrated in decreasing amounts progressing away from the interface plane and the contact surface for each plate, wherein the at least one additive alters at least one property of each plate. Materials with internal gradients and methods of making same.

16 Claims, 5 Drawing Sheets

(56) References Cited

U.S. PATENT DOCUMENTS

| | | |
|---|---|---|
| 6,389,699 B1 | 5/2002 | Ecer |
| 8,440,314 B2 | 5/2013 | Morton et al. |
| 8,499,673 B2 | 8/2013 | Keller |
| 9,717,176 B2 | 8/2017 | Stoffel et al. |
| 2003/0029530 A1* | 2/2003 | Junius .................. B22D 11/008 <br> 148/516 |
| 2007/0277492 A1* | 12/2007 | Ekis ..................... A01D 34/736 <br> 56/12.1 |
| 2013/0133785 A1* | 5/2013 | Nozue .................. B23K 20/028 <br> 148/526 |

FOREIGN PATENT DOCUMENTS

| | | | |
|---|---|---|---|
| SU | 14451 A1 | 3/1930 | |
| WO | WO-2010136899 A1 * | 12/2010 | ............. B23K 20/04 |

\* cited by examiner

INTERNAL GRADIENT MATERIALS, IMPLEMENTS AND METHODS

CROSS-REFERENCE TO RELATED APPLICATION

This application claims priority to U.S. Provisional Application No. 62/795,893 filed on 23 Jan. 2019. The entire contents of the above-mentioned application are incorporated herein by reference.

FIELD OF THE INVENTION

This invention relates to materials and implements with internal gradients and methods of forming same.

BACKGROUND OF THE INVENTION

Materials have been formulated and/or fashioned utilizing many different techniques in attempts to achieve desired performance characteristics. There are a number of implements such as knives, swords and other cutting, piercing and/or slicing tools that require certain strength, stiffness and/or flexibility properties while maintaining a useful edge for repeated cutting or slicing.

Lamination has been utilized to join three or more layers together to combine properties of each layer. Specialized techniques such as "san mai" combine different types of steel or other materials to make knives and swords. Many of the materials are expensive and some of the techniques are time-consuming Such combinations are not truly self-sharpening, as periodic sharpening is still required, albeit at a lesser frequency than with softer host cladding. The same characterization applies also to presently available specialty alloys including crucible steels such as Damascus steel, which also will dull over time and require resharpening.

It is therefore desirable to provide materials and implements made therefrom which are more overall cost-effective while still satisfying selected performance requirements.

SUMMARY OF THE INVENTION

An object of the present invention is to provide materials and implements with at least one internal gradient.

Another object of the present invention is to provide improved methods for making such materials and implements.

The term "implement" as utilized herein is intended in its broadest meaning to include: (i) tools such as knives, chisels, scissors, drill bits, cutting pliers, agricultural blades and other items having a blade; (ii) instruments including surgical instruments, and (iii) devices such as fish-hooks and needles.

The term "self-sharpening" as utilized herein means, after any form of challenge undergone by a solid edge of an implement, that solid edge becomes sharper or otherwise more fit for utilization. Such "self-sharpening" may occur during normal use of the implement as a tool, during cleaning, during storage, or in any other way to go through a "self-sharpening cycle" which is beneficial to the overall use of the implement and/or situation of the user or users.

The term "plate" as utilized herein includes sheets, slabs and other host forms for implements having at least one surface onto which one or more additives can be applied according to the present invention. An angle piece is an example of two plates which share a common longitudinal edge; the two angle plates can be forced together with at least one additive between the plates. A tube or pipe is an example of initially curved plates having two shared longitudinal edges; the two curved plates can be forced together by collapsing the tube or pipe with at least one additive between the plates.

This invention features an implement including a first plate and a second plate, each plate having a contact surface which abuts a contact surface of the other plate to establish an interface plane, and a gradient of at least one additive that is more concentrated at each contact surface and less concentrated in decreasing amounts progressing away from the contact surface for each plate, wherein the at least one additive alters at least one property of each plate.

In some embodiments, the interface plane has an outer boundary and the implement includes at least one working edge along at least a portion of the outer boundary of the interface plane. In one embodiment, the at least one additive increases hardness of the first and second plates, and the working edge is self-sharpening during use of the implement. In some embodiments, the at least one additive increases corrosion resistance of the first and second plates to a corrosive fluid, and the working edge is self-sharpening during immersion of the implement in the corrosive fluid. In certain embodiments, an internal gradient with increased corrosion resistance is provided according to the present invention by itself, or in combination with other properties such as increased hardness, decreased malleability or other plasticity, and/or increased abrasion ability. In some embodiments, one or both of the first and second plates are pre-formed into substantially final implement shape and, in other embodiments, the combined assembly is fashioned into an implement after processing according to the present invention. In certain embodiments, at least one of the first plate and the second plate is formed of a metallic material.

This invention also features method of making an implement. The method includes selecting a first plate and a second plate, each plate having a contact surface, and placing at least one additive on at least one of the contact surfaces. The contact surfaces are brought together, and pressure is applied to force the first plate and the second plate against each other. The method further includes applying at least one type of energy to the first plate and the second plate to fuse the plates together and to establish an interface plane at the contact surfaces with a gradient of the at least one additive that is more concentrated at the interface plane and less concentrated in decreasing amounts progressing away from the contact surface for each plate. The at least one additive alters at least one property of each plate.

In some embodiments, at least thermal energy is applied. In certain embodiments, the plates are pre-formed into a selected implement shape prior to establishing gradient. In other embodiments, the method further includes fashioning the plates into a selected implement.

This invention may also be expressed as a material formed to have an internal gradient and including a first portion and a second portion, such as a first plate and a second plate. Each portion has a contact surface which abuts the other portion to establish an interface plane, There is a gradient of at least one additive that is more concentrated at the interface plane and less concentrated in decreasing amounts progressing away from the contact surface for each portion, wherein the at least one additive alters at least one property of each portion.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

This invention may be accomplished by an implement, and methods of making same, including a first plate and a second plate, each plate having a contact surface which abuts a contact surface of the other plate to establish an interface plane, and a gradient of at least one additive that is more concentrated at the interface plane and each contact surface and is less concentrated in decreasing amounts progressing away from the interface plane and the contact surface for each plate. The at least one additive alters at least one property of each plate, such as enhancing hardness and/or corrosion resistance or decreasing plasticity at the interface plane.

Figure 1:
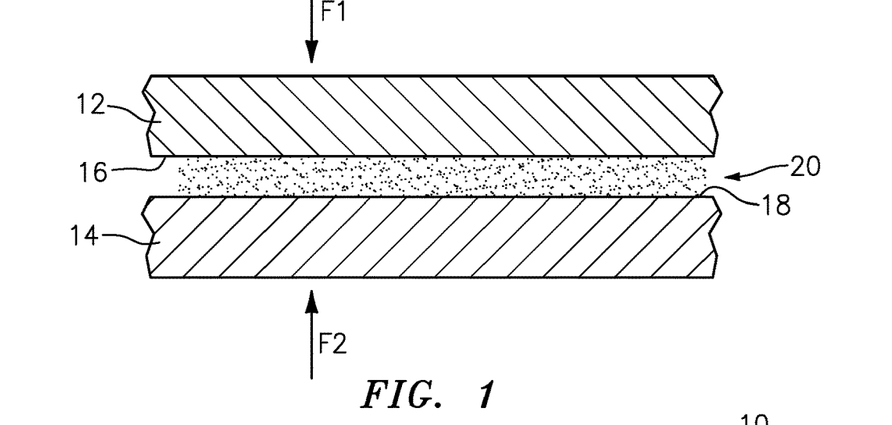
FIG. 1 is a schematic side cross-sectional view of two plates with an additive placed between them.

In one construction technique according to the present invention, a first plate 12 and a second plate 14, FIG. 1, are placed together after an additive 20 is placed on one or both of contact surfaces 16, 18. Arrow F1 represents a first force applied to first plate 12 at a surface opposite to contact surface 16 and arrow F2 represents a second force applied to second plate 14 at a surface opposite to contact surface 18. In one technique, forces F1 and F2 are both dynamic forces, such as by a hydraulic press that moves opposing pistons toward each other. In another technique, one of the forces F1 and F2 is static while the other represents force applied dynamically to one of the plates.

The two plates 12 and 14 of FIG. 1 are shown fused together as a monolithic assembly 10 in FIGS. 2 and 4 after processing according to the present invention, as described in more detail below, to establish an interface plane 30 having an internal gradient 21 including a first internal gradient 22 of additive 20 within plate 12 and a second internal gradient 24 of additive 20 within plate 14.

Each plate 12, 14 serves as a host plate, that is, each plate hosts at least one additive 20 which travels into that plate to establish the internal gradient 22, 24 within each plate 12, 14, respectively. The host plate may also be referred to herein as a "base plate" or "base material".

Figure 2:
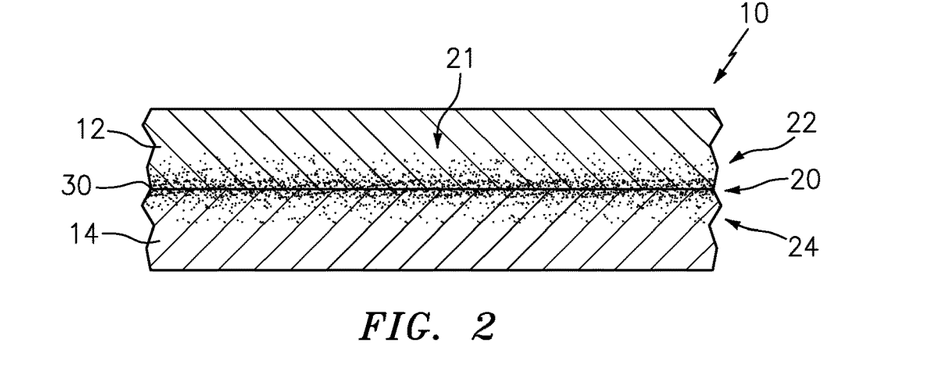
FIG. 2 is a schematic side cross-sectional view of the two plates of FIG. 1 after processing according to the present invention to form an implement assembly with an interface plane.
Figure 3:
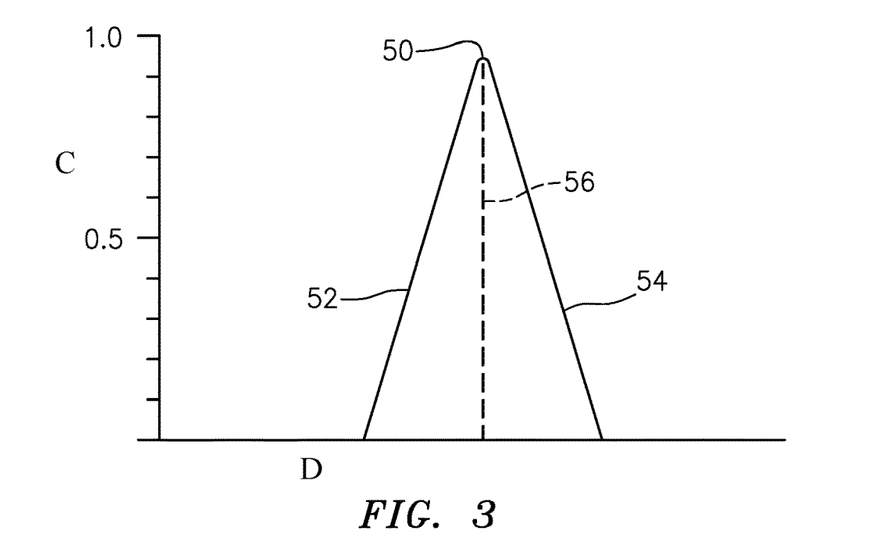
FIG. 3 is a graph schematically showing the internal gradient in the assembly of FIG. 2 relative to the interface plane.

FIG. 3 is a graph of concentration C on the y-axis and distance D on the x-axis schematically showing the internal gradient 21 in the assembly 10, FIG. 2. Dashed line 56 represents interface plane 30 having a peak concentration 50 of 0.95 in this construction. The concentration tapers off to zero within gradient 22 as represented by line 52 and within gradient 24 as represented by line 54. The "zero" concentration on either side of lines 52 and 54 indicate that no additives have migrated and/or diffused beyond that distance from the interface plane 30 as represented by distance from where dashed line 56 intersects the x-axis.

Figure 4:
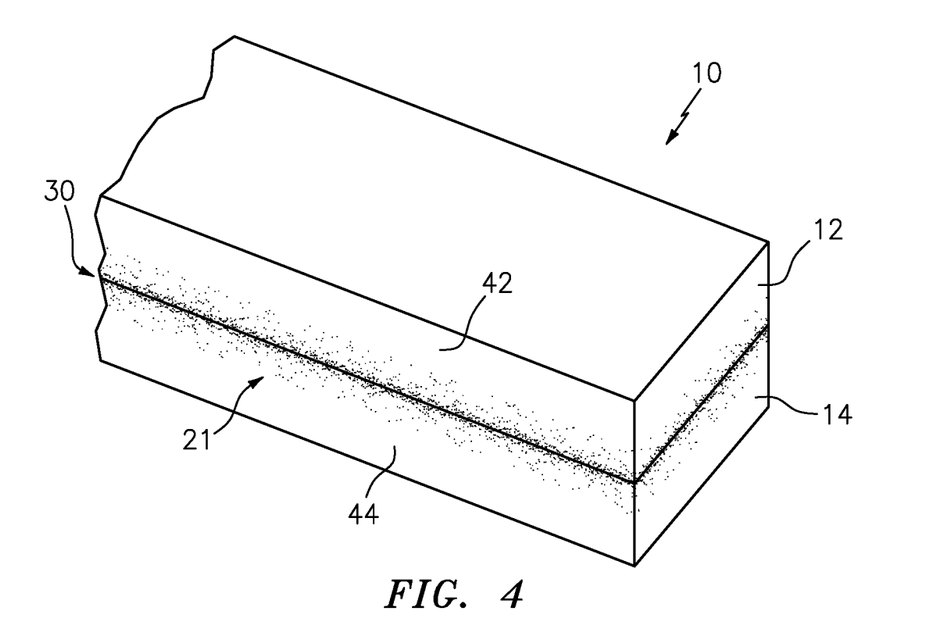
FIG. 4 is a schematic perspective view of the assembly of FIG. 2 prior to fashioning into an implement.

The assembly 10 of FIG. 2 is shown in FIG. 4 with plate 12 having an outer edge 42 and with plate 14 having an outer edge 44. In some methods according to the present invention, the edges 42 and 44 are sealed by crimping, welding or other sealing technique as described in more detail below.

Figure 5:
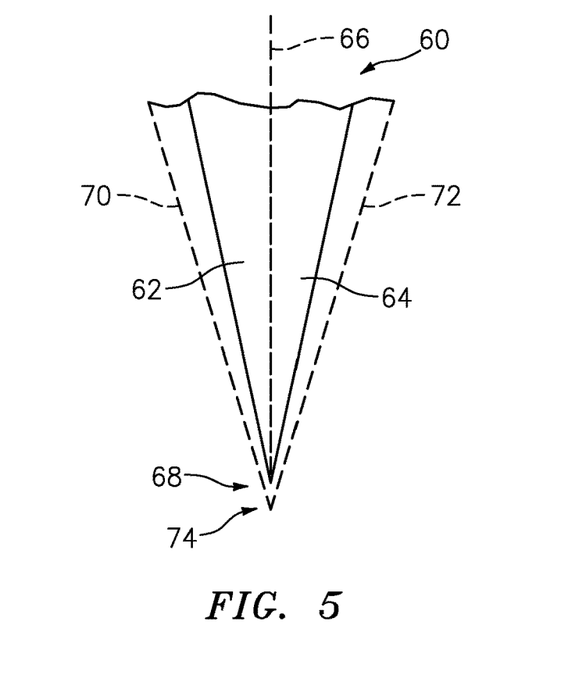
FIG. 5 is a schematic cross-sectional view of a knife edge of an implement fashioned from the assembly of FIGS. 2 and 4.

In this construction, the combined assembly 10 is fashioned into an implement such as a knife after processing according to the present invention. Knife blade 60, FIG. 5, represents an implement fashioned from assembly 10 of FIGS. 2 and 4 to have an edge 68 for performing work such as cutting, slicing, whittling, or other edge-related work. In other constructions, one or both of the first and second plates are pre-formed into substantially final implement shape.

Blade 60, FIG. 5, is shown with first portion 62 and second portion 64 which were fashioned from plates 12 and 14, respectively. Dashed line 66 represents interface plane 30. Dashed lines 70 and 72 meet at an initial edge 74 and schematically represent the initial dimensions of the knife blade 60 prior to first use. FIG. 5 is highly schematic and is not drawn to scale. Actual ablation and/or other erosive wear will depend on the characteristics of the initial host material, the types of additives dispersed within the host material, and the extent of dispersion according to the present invention as described in more detail below, such as extending or shortening heating and/or quenching steps. The rate of erosive wear will also depend on the type and extent of challenges presented to the edge 74. Generally, however, host material will be removed more readily from initial sides 70, 72 to achieve self-sharpening, with less wear at edge 74 which has the highest concentration of hardening additive in this construction. Stereoselectivity may also develop in response to challenges. In some cases, the self-sharpening edge becomes stereospecific, that is, by way of nonlimiting example, right hand whittling becomes more efficient during the whittling process, then switching to the left hand requires a few slices before the blade becomes optimal for said left hand whittling.

Figure 6:
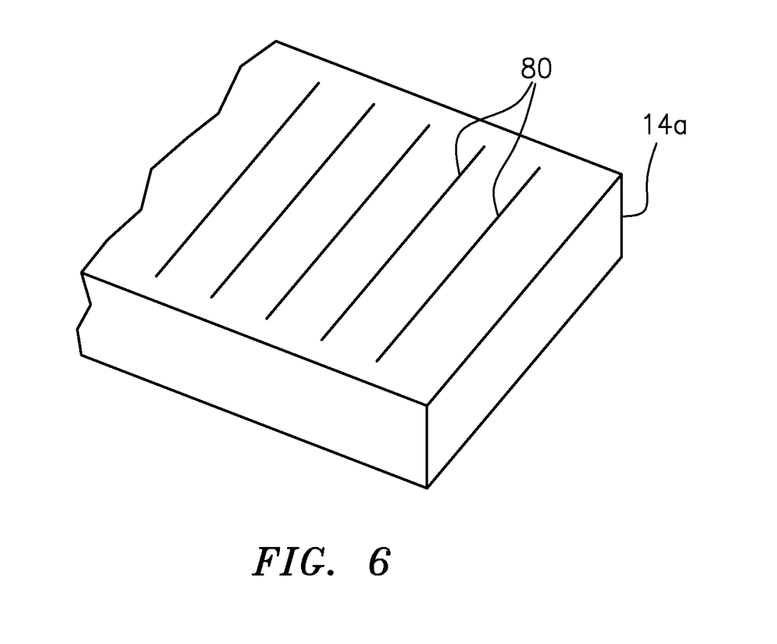
FIG. 6 is a schematic perspective view of a lower plate with strands of an additive utilized according to an alternative technique according to the present invention.
Figure 7A:
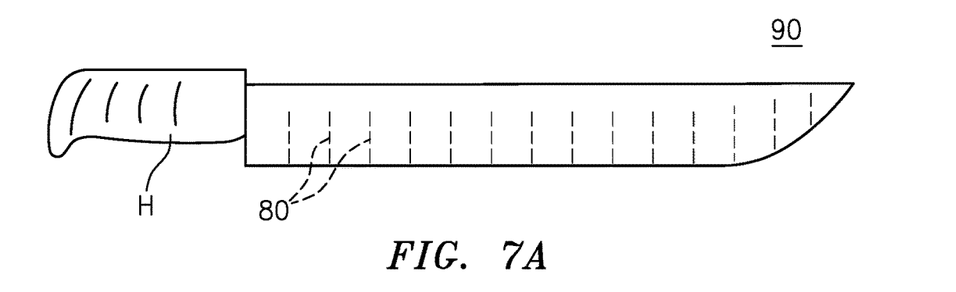
FIG. 7A is a schematic side view of an implement as initially formed utilizing plates with strands of FIG. 6 to have a smooth working edge.
Figure 7B:
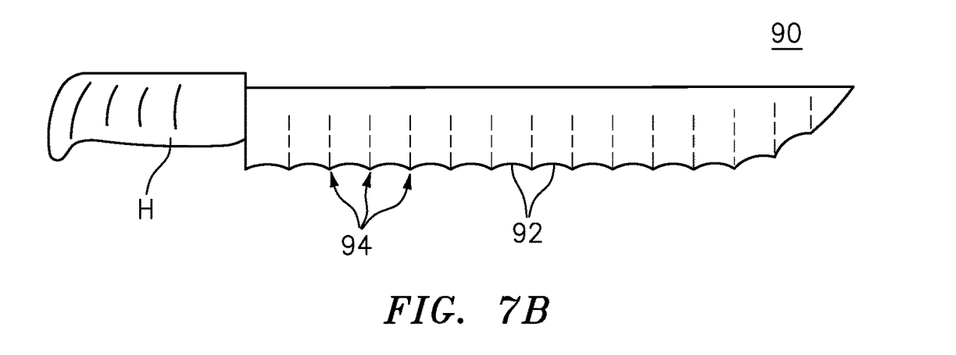
FIG. 7B is a schematic side view of the implement of FIG. 7A after usage to develop serrations in the working edge.

In another construction technique according to the present invention, strands 80, FIG. 6, of at least one additive composition is placed on a lower host plate 14a. The term "strands" includes ropes, striping, threads, and other non-uniform distribution of additives such as carbon applied to a host material according to the present invention. When the additive increases hardness, then types of serrations develop during use, as schematically illustrated in FIGS. 7A and 7B for knife 90 having a handle H. Strands 80, FIG. 6, are shown in dashed lines 80, FIGS. 7A-7B. After sufficient wear, knife 90 develops gullets (valleys) 92 between harder teeth (peaks) 94 which are reinforced by internal gradients developed from the strands 80.

In general, a gradient or a plurality of gradients may be applied according to the present invention to achieve many different, relatively the same, and/or highly specialized physical trait benefits. The gradients that result may be of any geometry to include by way of nonlimiting examples: vertical strands to achieve stripes such as in the serration nonlimiting example illustrated in FIGS. 7A-7B; only on the center edge, such as in the nonlimiting example of nitrogen; any other geometry in relative one dimension (dots or spots of additive), two-dimensions such as strands, and/or three-dimensional shapes.

Any of the vertical strands in this case depicted in the nonlimiting example of carbon, may be added in any gradient itself, not confined to this nonlimiting example of carbon "ropes", to manufacture blade edges which contain micro-serrations. These micro-serrations provide a strong "bite" when using the blade for handheld knife work, for example. This micro-serration effect is a strongly desired trait for knife edges, and is commonly added to freshly sharpened knives via a process called "steeling," and/or the micro-serrations are added by lightly touch-up sharpening the sharpened knife with a relatively coarse grit sharpening media. We have found that when we initially surface the knives, the scratches left by the surfacing media, such as sandpaper, may contribute to the generation of the micro-serrations which our material beneficially provide. When strongly challenged by cutting wood, cardboard, pressed cardboard, etc., the micro-serrations persist throughout. This has included very strong challenges such as over 25,000 slices of about 5 lbs pressure, through softwood and cardboard. The existence and persistence of the Verd Steel micro-serrations are beneficial over other knives which tend to become smooth when subjected to large amount of moderate slicing challenge (such as being used to cut food).

Figure 8:
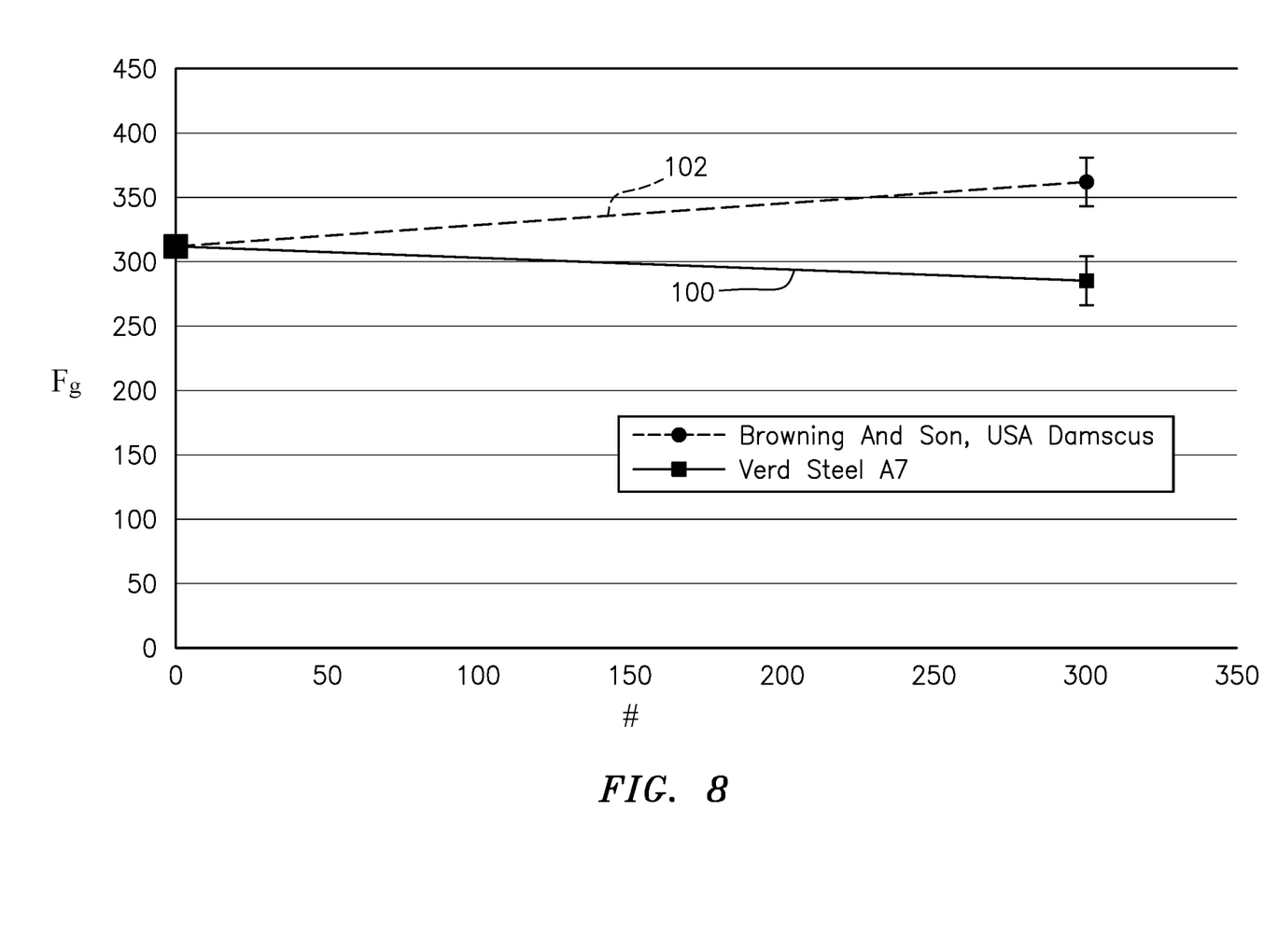
FIG. 8 is a graph of force Fg needed to break line (grams) versus total number # of slice challenge cuts into cardboard and wood for a knife blade made of Verd Steel A7 according to the present invention versus a conventional knife blade.

FIG. 8 is a graph of force Fg needed to break line (grams) versus total number # of slice challenge cuts into cardboard and wood for a knife blade made of Verd Steel A7 according to the present invention, solid line 100, versus a conventional knife blade, dashed line 102. These results were generated by testing two knife blades, one blade on a noted high-quality custom Damascus knife from Browning and Son, and the other blade made of Verd Steel formulation A7 according to the present invention. Both knives were sharpened with Chef's Choice Professional Sharpening Station 130, then tested for sharpness to determine initial sharpness using an Sharp PT50A Electronic Knife Sharpness Tester with DTC100 test clips. Then both knives were challenged with a total of 300 slices each, 150 sliced through used quarter inch packing cardboard, and 150 cuts sliced into softwood. Finally, the knives were again tested for sharpness using the above method.

Data points in FIG. 8 indicate averages of five measurement points. Results show the Browning and Son knife responded to the challenge and dulled, requiring 51.8 g more force to break the test media than before the challenge. The Verd Steel knife got sharper, requiring 25.8 g less force to break the test media than initially. This shows that under conditions where a quality knife dulled due to reasonable challenges, the Verd Steel knife described herein became sharper and with improved performance.

In one method according to the present invention, the minimum number of steps are as follows. First, prepare the surface of steel or other host material to a fresh surface wherever additive is to be applied. Second, add one or more additives to the selected surface(s) of the host material. As non-limiting examples, the additive can be graphite alone, urea alone, and/or hard particles such as ceramics alone. The particles can be sizes from ultra-nano (below 1 nm diameter), up to large crystals of 0.5 mm. Third, add energy to achieve an internal gradient, such as thermal energy and/or pressure: place at least two plates together, apply heat, and press to fuse the plates.

In one construction according to the present invention, type 1018 tubular steel and over 10 grams of 0.05 micron particle diameter silicon carbide were combined and pressed together into a self-sharpening knife with a gradient, and found a workable, albeit about 1 mm thick, self-sharpening blade. Likewise, we have added over 10 grams of 0.05 micron particle diameter alumina into similar A36 steel tubes.

Conversely, we have used a total of 0.4 uL of 1,2-diaminocyclohexane into a 36 inch square 80CrV2 plated system, and found a thin and sharp, self-sharpening blade was produced. The level of diffusion, and hence the shape of the selected-for cutting profile, is adjustable by changing the temperatures and times of heat treatment. For example, a thick piece of A36 low carbon steel was made with additives of 1,2-DACH, 50 nm silicon carbide, and 50 nm boron carbide blade was made. The blade was cut in two to make two pieces with complete self sharpening layers. One piece was further exposed to 871 C for 8 hours, the other piece was not reheated after being pressed as the original larger piece. Both pieces were then immersed in a fluid to allow visual estimation of the size of the gradient diffusion.

Intentionally manipulating the extent of diffusion before locking in via quench is illustrated by this example. The piece which had heated for longer times in the above example showed much more diffusion, meaning that this piece also would self-sharpen into a wider blade edge profile, than the other piece which was not further heat treated. Therefore, by way of manipulating the host materials, additives, additive amounts, method of surface preparation, method of sealing the space (if sealing is to be done), time, temperature, number of presses, and/or the time and temperature of thermocycling, specific self-sharpening materials may be made as well as further optimized to fit specific applications selected by a user.

Figure 9:
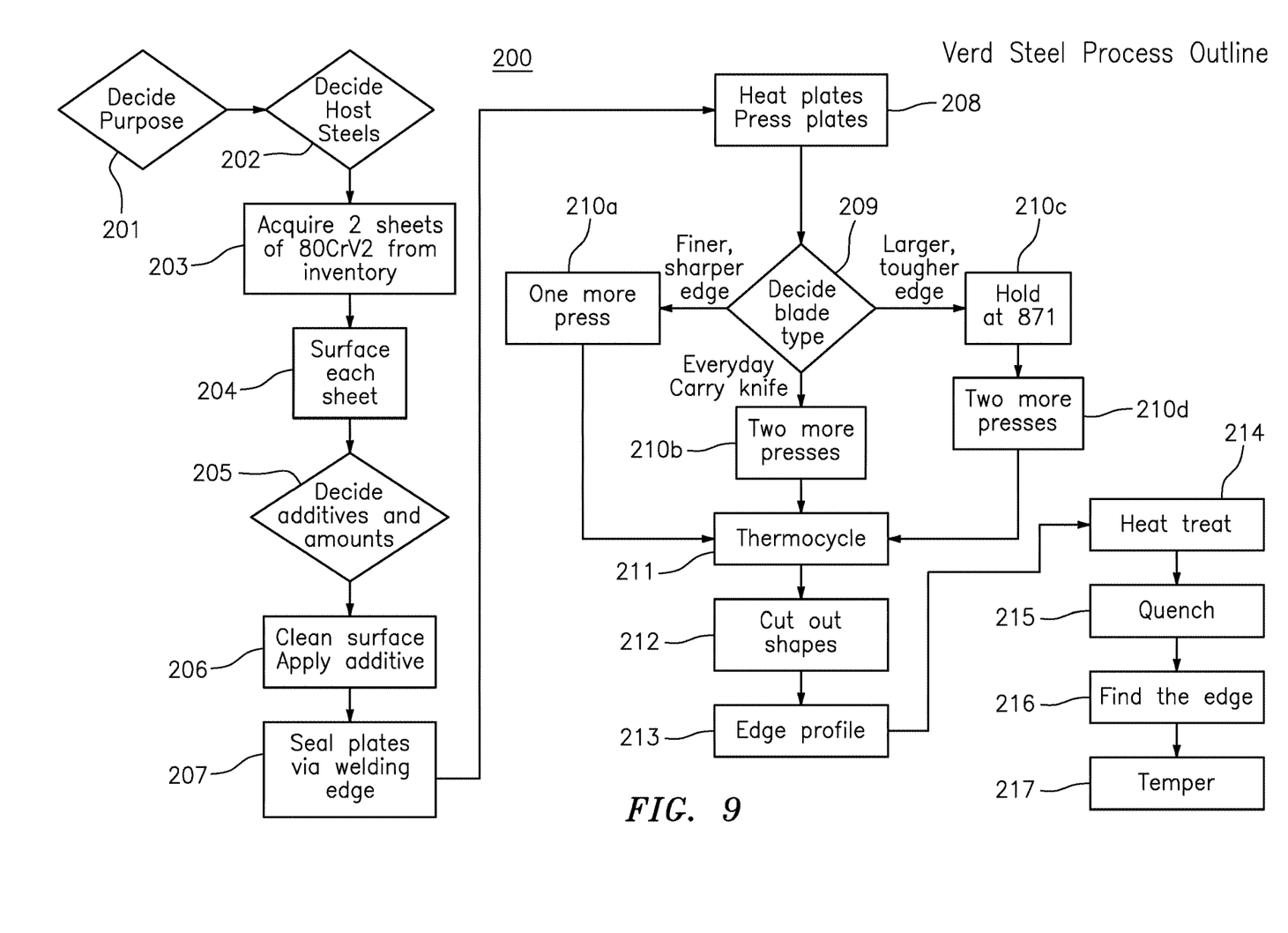
FIG. 9 is a flowchart of a process outline according to one aspect of the present invention.

One set of method steps is depicted in flowchart 200, FIG. 9 to manufacture a blade having an internal gradient according to the present invention. The purpose of the end product is decided, step 201, and the host material such as appropriate type of steel is selected, step 202. For two sheets of 80CrV2 serving as plates of host material, it is acquired, step 203, and then each sheet plate is surfaced, step 204. Additive compositions and amounts are decided, step 205, to accomplish the selected end purpose, and the one or more additives are applied to selected clean surfaces of the sheet plates, step 206. In this embodiment, the edges of the plates are sealed, step 207, such as by welding around the external edges, typically utilizing MIG (Metal inert gas) welding with a consumable wire electrode. The plates are then heated and pressed, step 208.

The type of blade is selected, step 209, leading to (i) one more press selected to achieve a finer, sharper edge, step 201*a*, such as for a fish filleting knife (ii) two more presses selected to achieve an everyday carry knife, step 210*b*, or (iii) holding at a temperature such as 871 C to achieve a larger, tougher edge, step 210*c*, plus two more presses, step 210*d*, such as for an axe or hatchet head. Next, the blade is placed through one or more thermocycles, step 211. Final blade and/or tang shapes are cut, step 212, and the initial edge profile is established, step 213. The blade is heat treated, step 214, and then quenched, step 215. The edge is then found more precisely, step 216, and then the blade is tempered, step 217. More detailed examples of different host materials, additives, and processing parameters are provided below.

In addition to the terms "implement", "self-sharpening" and "plate" defined above, other terms utilized herein are set forth as follows. The term "sharper, sharpening, sharp, etc." means to provide for an edge which more easily slices or is in a present acceptable state for slicing into reasonably chosen solid materials for which the implement is made, which is the end goal of most sharpened relatively implements. Sub-factors which may or may not apply to said "sharpness" include edge profile(s), edge lubricity against the solid to be cut, any other geometry of the edge, serrations, micro-serrations that may provide "bite" to the slice.

The term "slicing, slice, slicer, etc." means to engage a blade with a solid surface as such that the linear contact surface of the edge of the blade is moved along the same line as described as the contact surface between the blade and the solid material at rest, at approximately 90 degrees, straight into the solid surface. The term "slice" herein also applies to include all of the following in any combination: "cutting" where there is a push on the blade into the material being cut, without a "slicing" action, "chopping" where the blade is moved to the surface and struck with velocity to impart the desired effect, "piercing" where a point is pushed into the material to receive treatment, and any and all other methods/techniques to engage materials in order to have an effect where a gap of any kind is created within the engaged material.

The term "whittle" and "whittling" means to pare away, or to slice away a small piece of wood, usually on the edge of a squared board, by cutting into the grain at an angle The term "metals" and "metallic" includes all types of steel and steel alloys, iron material which contains carbon, iron-based materials, and includes all other metallic materials which may benefit from the self-sharpening gradient layer production according to the present invention including nonlimiting examples of aluminium, titanium and metalloids.

The term "host material" includes metals, polymers including epoxies, elastomers including rubber, glass, crystal, ceramics, woods, elastomers, and any other materials which develop an internal gradient when processed according to the present invention.

The term "additives" embodies the addition of anything to affect a benefit, such as chromium, to aid in self-sharpening and/or blade performance directly, and/or self-sharpening ability. Sometimes referred to herein as "materials added."

Implements with internal gradients according to the present invention are useful in various endeavours including for agricultural uses. Any mowing, grinding, chopping, particle size reduction (comminution) processes in agriculture would greatly benefit from this technology. These agricultural benefits include less labor to change blades because blades according to the present invention self-sharpen and last longer, higher efficiencies, less fuel consumption, and less wear on all drive parts leading to the cutting edge. As an example, hay knives with gradients according to the present invention have been tested in a commercial hay cutter, and self-sharpening ability was present in this real-world application.

Although implements have been described above with self-sharpening edges, this is not a limitation of the invention. Internal gradient materials according to the present invention can have one or more of the following properties:

i) Self-sharpening during use;
ii) Increased strength;
iii) Resistance to delamination and/or separation;
iv) Electrical capacitance;
   (1) For physical strength increase;
   (2) For other selected reason;
v) Electrical resistivity;
vi) Electrical conductance;
vii) Physical strength;
viii) Corrosion resistance;
ix) Micro- and/or macro-serrations;
x) Cutting ability increase of any kind;
xi) Edge strength;
xii) Edge retention;
xiii) Edge sharpness;
xiv) Stabilization of edge and/or blade;
xv) Grain modification of base material;
xvi) Toughness;
xvii) Abrasion resistance;
xviii) Ablation resistance
xix) Plasticity such as ductility and/or malleability; and/or
xx) Breakage resistance.

Such materials according to the present invention can provide one or more of the following benefits:

a. Very high property flexibility and/or tunability of finished products, processes to make products, and selections to make the products fit for purpose.

b. Combinatorial nature; for illustration, consider conventional knife edge blade making for nonlimiting exemplary purposes only—there are unlimited different materials which may added to the edge, in an unlimited number of combinations and both overall and relative concentrations. Further, different additive types alone or in combination, different process such as temperatures, times of heating, pressing, choices of base metals, variants of surfacing the base metals, for an exemplary nonlimiting list for illustrative purposes only, result in different diffusion rates and extents of various types of additives.

c. Because very small amounts of additive are needed, a large difference in the overall effect is realized in many cases. As an example and for illustrative purposes only, in one construction an implement processed according to the present invention is a knife that is 7.5 inches long by 2 inches wide, which yields a surface area of 15 square inches. If the self-sharpening thickness range is by amount, such as 2% of the additive by mass down to 0% of the additive by mass over a distance range of 50 nm (about the thickness of a sharp razor edge), then 500 cm2×50 nm=0.025 cm3. Given a density of steel about 8.0 g/cm3, then 0.025 cm3×8.0 g/cm3, then in this knife, an additive amount gives 0.2 g, which at a target level of 2% is 0.004 g, or 4 mg.

TABLE 1

Host materials reduced to practice as plates using an additive combination of 1,2-diaminocyclohexane, 50 nm silicon carbide, and 50 nm boron carbide particles. Many of these host materials, also referred to as base materials, were additionally used to produce self sharpening materials with individual additives of urea, nitrile, graphite, or 50 nm alumina particles.

| Host Material | added, sealed, hot-pressed | Quenched/ profiled | Found the "edge" by grinding/ sanding | Self sharpening ability present (mechanical challenge) |
|---|---|---|---|---|
| 1018 | X | X | X | X |
| A36 | X | X | X | X |
| D2 | X | X | X | X |

TABLE 1-continued

Host materials reduced to practice as plates using an additive combination of 1,2-diaminocyclohexane, 50 nm silicon carbide, and 50 nm boron carbide particles. Many of these host materials, also referred to as base materials, were additionally used to produce self sharpening materials with individual additives of urea, nitrile, graphite, or 50 nm alumina particles.

| Host Material | added, sealed, hot-pressed | Quenched/ profiled | Found the "edge" by grinding/ sanding | Self sharpening ability present (mechanical challenge) |
|---|---|---|---|---|
| O1 | X | X | X | X |
| A2 | X | X | X | X |
| A8 | X | X | X | X |
| A11 | X | X | X | X |
| 1075 | X | X | X | X |
| 1084 | X | X | X | X |
| Leafspring | X | X | X | X |
| Bandsaw blade | X | X | X | X |
| 321 | X | X | X | X |
| 304 | X | X | X | X |
| 420 | X | X | X | X |
| 8670 | X | X | X | X |
| Cruforge V | X | X | X | X |
| AEBL-2 | X | X | X | X |
| 52100 | X | X | X | X |
| Aluminum | X | X | No | No |
| 440 B | X | X | X | X |
| Old file | X | X | X | X |
| Beta C (titanium) | X | X | X | X |
| V4E | X | X | X | X |
| K390 | X | X | X | X |
| 26C3 | X | X | X | X |
| Elmax | X | X | X | X |
| Metal crate banding | X | X | Not tested | Not tested |

TABLE 2

Types of additives utilized according to the present invention. Note that many of these additives are also key components of sintered materials, melted casts, and/or are steel property modifiers via corrosion resistance, forge weld fusion characteristics, toughness, hardness, abrasion resistance, contribution to micro-serrations, grain size management, changing phase diagram crystallization patterns and/or features, ability to make nitrides and/or carbides, contribute in any way to carbonization, carbonitriding or similar, nitriding, and other property managing features. In this way, the internal gradient may be considered some type of a "super steel" as it renders the implement capable of what has been previously unavailable.

| Additive | added, sealed, hot-pressed | Quenched/ profiled | Found the "edge" by grinding/ sanding | Self sharpening ability present (mechanical challenge) |
|---|---|---|---|---|
| Urea | X | X | X | X |
| Nylon | X | X | X | X |
| Nylon-6,6 | X | X | X | X |
| Graphite | X | X | X | Not tested yet |
| No additive | X | X | X | No |
| 50 nm alumina | X | X | X | X, better in addition with C/N |
| 50 nm boron carbide | X | X | X | X, better in addition with C/N |
| 2500 grit silicon carbide | X | X | X | X, better in addition with C/N |
| Boron nitride | X | X | X | Not tested yet |
| Senesced grass blades | X | X | X | No |
| Softwood shavings | X | X | X | No |
| Complete multivitamin, equate brand, adults 50+, iron-free | X | X | X | No |
| Vanadium | X | X | X | Not tested yet |
| Stainless steel powder, 316L-325 mesh | X | X | X | No |
| Stainless steel powder + 1,2-DACH + BC + SiC | X | X | X | X |
| Cobalt, 99.9% pure, powdered before sealing between plates | X | X | X | X |
| Gallium, 99.99% pure, added by brushing on liquid gallium metal to each plate before being sealed by welding | X | X | X | X |
| Gallium + 1,2-DACH + BC + SiC | X | X | X | X |
| Manganese, 99.8% pure, powdered before sealing plates | X | X | X | X |
| Manganese + 1,2-DACH + BC + SiC | X | X | X | X |
| Iron powder hydrogen reduced -325 mesh | X | X | X | No |
| Iron powder + Silicon + Manganese + Gallium + Cobalt + Stainless Steel powder | X | X | X | No |
| Aluminum | X | X | X | No |
| Parafilm wax | X | X | X | Inconclusive |
| 321 stainless steel tool wrap, 2-layers, with 1,2-DACH + BC + SiC in between stainless layers | X | X | X | X |
| Copper | X | X | X | No |
| Nitrile | X | X | X | X |
| Blue nitrile glove | X | X | X | X |

TABLE 2-continued

Types of additives utilized according to the present invention.
Note that many of these additives are also key components of
sintered materials, melted casts, and/or are steel property modifiers
via corrosion resistance, forge weld fusion characteristics,
toughness, hardness, abrasion resistance, contribution to micro-
serrations, grain size management, changing phase diagram crystallization
patterns and/or features, ability to make nitrides and/or carbides,
contribute in any way to carbonization, carbonitriding or similar,
nitriding, and other property managing features. In this way,
the internal gradient may be considered some type of a "super
steel" as it renders the implement capable of what has been
previously unavailable.

| Additive | added, sealed, hot-pressed | Quenched/profiled | Found the "edge" by grinding/sanding | Self sharpening ability present (mechanical challenge) |
|---|---|---|---|---|
| Silicon, 99.99999% pure, crystals crushed between the metal plates before being sealed by welding | X | X | X | X |
| Niobium | X | X | X | X |
| Selenium | X | X | Not tested yet | Not tested yet |
| Tungsten powder plus diamond nano-particles | X | X | Not tested yet | Not tested yet |

The additives may be added in any form to include by way of nonlimiting example: gaseous deposition, liquid, solids, powders, gels, slurry's, spray on substance(s), mists, nebulized materials, impinging to one or more surfaces, reduction, electroplating, and any and all other mechanisms of addition. Some of these additives and additive combinations thereof will not require sealing the plate before heating, while others will benefit from edge sealing.

Example of Formulation A7

One technique for making Verd Steel formulation A7 according to the present invention, which is featured in FIG. 8 as described above, is as follows. First, two pieces of 0.110 thick 80CrV2 from Alpha Knife Supply (Cedar City, UT) are surfaced with 36 grit sandpaper on a KMG belt sander, then hand sanded lightly with 600 grit silicon carbide sandpaper to serve as host plates according to the present invention. The plates were then cleaned with low-lint cellulose wipes soaked in acetone, let to dry, then 1,2-diaminocyclohexane for a final amount of 4.0 uL per 36 square inch surface of each plate, 50 nm boron carbide particles for a final amount of 0.00832 g per 36 in square surface of each plate, and 50 nm silicon carbide particles for a total of 0.00894 g per 36 square inches of each plate, are added to a final concentration to allow 400 uL of acetone to be used as an evaporative carrier. Next 400 uL of this above stock is added to the surfaces and spread by pressing the two plates together and rubbing them together.

The two plates are then pressed together with targeted moderate pressure, about 5 psi, and the two plates joined together around the edge of the plates using laser welding, in order to form a sealed cavity inside the laser welded plates. Next, the welded together unit may be heated to 871 C over a 140 minute ramp from room temperature, and held for 30 minutes to allow time to gasify and become incorporated into the surrounding metal surfaces, and pressed with a force of 75 tons to the 36 inch square plates to form a plate assembly, also referred to as A7 material according to the present invention. Next the temperature is advanced to 1000 C over a 30-minute period, held at 1000 C for 5 minutes, and pressed again at 75 tons. The A7 material was then heated to 1250 C, held there for 10 minutes, pressed again at 75 tons, then removed from the press at about 700 C, and placed in dry vermiculite for slow cooling to room temperature.

The plate assembly of A7 material is then annealed by heating to 871 C over a 120 minute ramp, followed by allowing to cool to room temperature over at least 2 hours, ramping to 725 C over 1 hour and cooling at least for 2 hours, then ramping to 650 C over 1 hour and allowing to cool over at least 1 hour.

Next the A7 material was laser cut to profile, and the cutting edge was approached to about 1 mm using a stone grinder followed by stationary belt sander/grinder at 36 grit. The A7 material was then heated to 871 C over 1 hour, held for 5 minutes, and quenched in oil such as Parks AAA at 150 F. The A7 material was then heat treated for two hours at 350 F once, and allowed to cool inside the electric oven slowly, to room temperature.

Verd Steel A7 was then initially sharpened using 180 grit sandpaper on a KMG belt sander, carefully using a hollow grind and allowing the material to rather "float" down to the more abrasion-resistant inner gradient. The A7 material was then used to slice wood, cut cardboard, and hack through softwood to ensure the self-sharpening ability before being subject to re-profiling/sharpening and testing alongside the Browning and Son Damascus knife as depicted in FIG. 8 as described above.

Regarding pressure and other energy applied to host material, amounts utilized for the pressing includes using less than 1 ton up to 150 tons, with current press capability up to 400 tons. Also, what has worked is hand-held anvil forging using hammers, anvils, sledges, with anywhere from 1 to well over 20 reheating and hammering events or cycles thereof. Heaters have included propane forges, propane forges with compressed air addition, and an electric furnace. Temperatures that have worked for the diffusion processes to make the gradient have been as low as 300 C and as high as 1250 C, although this range can likely be expanded slightly. Dissimilar metals we have used include 15N20 paired with 80CrV2, and 15N20 paired with 8670.

As noted above, an angle piece is an example of two plates which share a common longitudinal edge that is already sealed; the two angle plates can be forced together with at least one additive between the plates, and then the opposite edge and the two ends can be sealed. A tube or pipe is an example of initially curved plates having two shared and sealed longitudinal edges; the two curved plates can be forced together by collapsing the tube or pipe with at least one additive between the plates, and then sealing both ends.

Example of Cylindrical Host Material

In some constructions, host material is manufactured to be a cylindrical solid with radial internal gradient from center according to the present invention, which is useful for fishhooks, needles, and other implements having a circular cross-section with a piercing tip or other leading edge that benefits from increased hardness, corrosion resistance, and/or other additive property that is enhanced at the center of the implement. In other constructions, the host material is initially hollow such as a tube or a pipe.

An example utilizing a metallic pipe is as follows. Low carbon, mild steel purchased from Home Depot as Tube Steel, 5/16" with heavier wall. Inside was clean as purchased, outside was clean, smooth, shiny surfaced from polishing, with very little rust. Inside looked "shiny" clean when holding up to light and looking through. The tube was cut into 6 pieces with hacksaw. Hacksaw went through quickly, testament to the tube being of mild steel.

To each piece, while still cool, one end was hammered shut with a mallet on an anvil. Created 5 treatment conditions:

Control. Hammered both ends shut, partially flattened the center. Hammered one end at a skewed angle to the tube-length partial flattening, to ensure ID could be recovered.

Experimental A. Hammered one end shut, added small amount of 0.05 micron alumina, hammered other end shut, hammered middle partially shut.

Experimental B. Hammered one end shut, added length of nylon rope through the open end. Packed rope into the other, closed end. Hammered a pinch point (like an hourglass) into the center, then hammered the other end closed, and hammered the open-area portion partially closed.

Experimental C. Repeat of B.

Experimental D. Hammered one end shut. Added small amount of nylon, small amount of 0.05 micron alumina powder. Hammered other end closed. Partially flattened center section.

Experimental E. Added large amount of nylon rope and packed in center of tube. Added large amounts (all that would fit) of alumina to each side of the nylon rope in the tube, packed in with a steel rod. Then hammered each end shut and partially flattened the center section.

Each series was then put in a forge and heated to yellow glow (and non-magnetic), for about minutes each. After 8 minutes, each tube was quickly taken by tongs from the forge to an anvil, where the partially flattened areas were quickly beaten together with a mallet using quick, medium-striking energy for hand forging. Each piece was then added back to the forge and re-heated and subsequently hit with the mallet, for a total of 3, cycles (including the first cycle).

Each series was then allowed to cool to ambient temperature for about 45 minutes. Then each piece was added back to the forge, allowed to come up to yellow-hot for 3 minutes, then quickly quenched and worked back and forth in used motor oil until cool. Each flattened tube was then tested directly, without subsequent heat treating, due to being mild steel for almost all of the metal. Findings show that each resultant blade self-sharpened where forge weld fusion was intact. Further, tubes containing high levels of abrasive were able to saw into a chisel as well as a hammer head.

Chemical Corrosion Example.

An internal gradient with increased corrosion resistance can be provided according to the present invention by itself, or in combination with other properties such as increased hardness and/or abrasion. Blades with an internal corrosion-resistance gradient can self-sharpen by periodic immersion in vinegar, salt water, or other corrosive fluid such as an ionic and/or acidic solution. Blades have been made which self-sharpen during overnight immersion in vinegar. Other blades have been made which combine self-sharpening by corrosion (with internal corrosion gradient) and self-sharpening by usage (with internal hardness gradient) plus nanoparticle abrasives (as an abrasive gradient).

As one working example of making an internal corrosion gradient, two thin sheets of 321 stainless steel were added between two plates of 0.110 inch 80CrV2. Additives of 1,2-diaminocyclohexane plus 50 nm silicon carbide and 50 nm boron carbide were placed between the two sheets of 321 stainless steel. Sandwich to make 80CrV2>321 stainless steel>additives>321 stainless steel>80CrV2. Weld exterior, heat and press similar to Verd Steel A7 example described above. This material has been found by us to become much sharper when left in dilute acid (HCl), or saltwater (NaCl ~4% w/w). Also self sharpening by such corrosion challenge has been additives of 1. Pure gallium, 2. Pure stainless steel powder, 3. Stainless steel powder plus silicon carbide 50 nm, boron carbide 50 nm, and 1,2-diaminocyclohexane (4 uL). Further still, additives of powdered pure cobalt, powdered pure silicon, powdered pure silicon plus 50 nm silicon carbide and 50 nm boron carbide and 4 uL 1,2-diaminocyclohexane were found to self-sharpen due to immersion in the above acidic solutions, saltwater, or other corrosive environment. Finally, an additive mix containing pure iron powder, pure silicon powder, pure manganese powder, pure gallium, pure cobalt powder, and powdered stainless steel resulted in a 80CrV2 coupon which self sharpened when immersed in dilute hydrochloric acid over 18 hours.

ADDITIONAL EXAMPLES

As another example, a self-sharpening knife edge was made according to the present invention from 80CrV2 base (host) steel, using 1,2-diaminocyclohexane, 50 nm silicon carbide, and 50 nm boron carbide as described herein. This knife received over 25,000 slices into dry bamboo, dry pressed cardboard, dry softwood (crosscut and lengthwise), and additionally was used similar to a hatchet to hack into a dry softwood 4×4 pole for over 50 strong hacks, which each produced chops over 0.5 inches deep, with most being about 1 inch deep. This knife was found to self-sharpen in that it 1) would get sharper over time if initially it was rather dull, 2) would maintain very good sharpness over time, and 3) if intentionally damaged, would respond by becoming sharper during use. NOTE: the hardened edge is of a different, brightly-colored material than the base steel; the edge that the knife resulted in was rounded from the large challenge, but micro-serrations remained and were developed throughout the testing. The large wear challenge rounded the serrations to an extent, but the wear served to increase the amplitude between gullets and teeth, which remained intact, very sharp, and kept the micro-serrations which led to great "feel" and slicing ability into diverse testing media including paper.

Under magnification, a microscopic serpentine nature of serrated edge was observed, much like a crosscut saw, and the discontinuous nature of the edge was seen in focus, which testifies of the sawtooth edge. Also note this is the edge that was resolved by using the blade, not by sharpening the blade with a device intended for sharpening. Therefore, this is the continuous "working edge" that remains during strenuous cutting and chopping using the blade.

A more detailed example is provided as follows, suitable for knife steel of any kind to create internal gradients to facilitate self-sharpening function. First, add carbon, +/−nitrogen sources, +/−particles between selected metals. For example—the knife steel 80CrV2, with added 1,2-diaminocyclohexane at the rate of about 0.1 uL/in^2 metal, and the particles Silicon Carbide and Boron Carbide added as the about 0.05 um particles. Two pieces of 80CrV2 may be surfaced with increasingly finer grade of sandpaper, cleaned with low-lint cellulose wipe soaked in acetone, let to dry, then the particles may be added in acetone and spread over one or both surfaces. Then an amount of about 0.1 uL/in^2 1,2-diaminocyclohexane may be added to the center of one plate. The two plates may then be put together with targeted moderate force, about 1 psi, and the two plates joined together around the edge of the plates using Laser Welding, in order to form a sealed cavity inside the weld. Next, the welded together two plates may be heated to 1550 degrees F. over a 30-minute ramp from 75 degrees. F, and held for 5 minutes to allow time to gasify and become incorporated into the surrounding metal surfaces. Next the temperature may be advanced to 2000 degrees F. over a 30-minute period, and the material pressed at 2000 psi. Finally, the material may be heated to 2200 degrees F. over 5 minutes, and pressed at 4000 psi.

Next, the now-fused plate, being singular in form, may be annealed using thermocycling techniques to relieve stresses and to control grain size. For example, the material may be heated to 1600 degrees F. over 10 minutes and held for 5 minutes, and placed in a vermiculite/perlite dry insulator to facilitate slow cooling, or temperature programmed cooling to achieve 75 degrees F. over 4 hours. Next the material may be heated to 1425 F over 10 minutes and held at 5 minutes, and slowly cooled to achieve 75 degrees F. over 4 hours. Likewise, the material may be heated to 1200 degrees F. and slowly cooled. These parameters may vary, but are collectively referred to as "temperature cycling" for knife making.

Next, the material may be cut by a variety of methods, including laser-cutting, water-jet-cutting, or any other cutting method, and/or ground with sandpaper and/or abrasive stone media, to achieve the first profile of the desired knife.

The material may then be heated to 1600 degrees F., held for 5 minutes, and quenched in oil such as Parks AAA at 100 degrees F. The material may then be heat treated at 350 F twice, for 2 hours each time, to achieve tempering.

The material may then be sharpened to "find" the self-sharpening edge. This may be done by commercial knife sharpeners, or simply held against moving sandpaper. The edge is typically very easy to find as there is much more physical resistance to the abrasive challenge of the machines being used to sharpen.

Any handle or other configuration may then be added to the implement. The knife is now in the self-sharpening condition, ready to engage in many possible uses.

It is to be noted that ranges of acceptable treatment parameters are very wide, especially if a change in a first treatment parameter is compensated or balanced with a corresponding change in a second treatment parameter. For example, fusion of steel with one or more additives can be accomplished with higher temperatures and lower pressures, vice versa, and/or the use of various additives which change the steel forge welding characteristics.

Additive addition rates have been utilized from ng to g levels and success has been achieved over this entire range. The application that the resultant steel is designed for requires different widths and different gradient properties. We have made gradients from nearly unmeasurable by microscopy (likely about 1 nm wide), through and up to about 2 mm wide.

Another material property that can be altered by one or more additives is plasticity such as ductility or malleability. Decreasing malleability at the center of the gradient reduces the material's ability to deform under compressive stress such as generated by impacts against the implement, which flows material away from the center of the gradient. Internal gradients according to the present invention which affect plasticity allow the host material to flow preferentially away from the more rigid center plane, without a specific layer peeling away, and further, to flow away as a mechanism to provide for the ability to self sharpen.

Types of Materials Utilizable According to the Present Invention:

A. Knife steel of any kind: creating internal gradients to facilitate self sharpening function. Knife steel may be any steel regardless of manufacturing method, composition and/or use.

B. Relatively low "hardening" steel and materials, which may be made into self sharpening functional units by internal gradients:
 Mild steels such as A36, 1018 to 1055;
 Mild stainless steels such as 300 series, 400 series, to include 304, 316, 420, 440, any quality of any of these; and/or
 Any scrap metal or relatively unknown metals.

C. Using Laser Welding and/or Laser Cutting as a key tool in producing the internal gradients.

D. Using a method to allow all the additives to incorporate into the internal gradient.

E. Adding anything to augment/stabilize/produce self sharpening gradients.

F. Producing self sharpening systems which sharpen in response to:
 Abrasion and/or cutting of any kind
 Impact
 Corrosion
 Oxidation
 Solubilization
 Chlorides, for example, in oceanic and/or other saline waters
 Temperature
 Any other energy applied to the material.

G. Use of internal gradients for other purposes, including:
 Batteries;
 Capacitors
 Weapon-resistant armor
 Intentional weathering of internal parts
 Mechanical induced, or augmented, weathering
 Material bonding.

ADDITIONAL INFORMATION AND CONSIDERATIONS

Self-sharpening gradients according to the present invention can be applied to one-sided systems, multi-sided systems, and including systems with multiple layers, complexities of morphology to include any shape, of self-sharpening within the same piece or different pieces. Using diffusional techniques to generate metal-gradient physical differences, that, when subsequently are challenged with regular, irregular, or specific system(s), result in a self-sharpening system. Although metallic materials are currently preferred, any material may partially or fully substitute for "metal" in the said metal-gradient. For example, ceramic or mineral particles such as diamond particles, particularly diamond nanoparticles, can serve as additives to an epoxy host material such as G10 fiberglass.

Additional additives can be utilized to provide an additional benefit of the same trait (in this case hardening), and/or may provide a synergistic, independent, or detriment to the other additive or additives such as carbon. For nonlimiting example, nitrogen may be added to generate gradient or gradients which might exhibit diffusional edge stability or stabilities which are manifested over larger distances, for nonlimiting example from 0 center plane, to 2 mm. In this nonlimiting example the carbon concentration gradient provides for the fine self-sharpening trait of the edge, while the nitrogen gradients assist the edge to resist edge-rolling during use of the edge in any device. Such nonlimiting examples of gradient or gradients may be applied to many different, and relatively the same, or highly specialized physical trait benefits. The gradients that result may be of any geometry to include by way of nonlimiting examples: vertical "stripes" such as in the serration example discussed above in relation to FIGS. 7A-7B; only on the center edge, such as in the nonlimiting example of nitrogen below; any other geometry in relative 1-D (dots), 2-D, and/or 3-D spaces and shapes. Skilled practitioners will recognize the value and values of the increased applications which arise from such lateral and diverse geometry of diffusion and/or other gradient forming mechanism or mechanisms provide.

Any surface deposition methods or any other structural method which may impact the said gradient to include for nonlimiting examples for understanding purposes:
  Laser printing
  3-D printing
  Inkjet printing
  Any other type of printing
  Pre-printed material which may be "slipped" in between two pieces of planar metal.
  Pre-made and/or pre-assembled systems of additives which may be added between metal that will be joined, for the purpose of providing for establishing the said gradient or gradients.
  Printed paper
    Plastics in any configuration including nets, webbing, webs, cylinders, woven materials, nonwoven materials, flat plastic with modifications, non-flat plastic with modifications, layered plastic or plastics, and to include use and or function with any other additive or series of additives or processing.

The gradient can be produced through any one of and/or a combination of the general process known as nitriding, carbonization, carbonitriding, chromium additions, addition of alumina, oxidation, reduction, or anything else. The gradient and/or gradients can be made by the use of gaseous incorporating systems including any or any combination from the nonlimiting example list that includes carbon monoxide, ammonia, hydrogen, natural gas, propane, methane, any alkane, alkene, alkyne, gases from heating coal or any solid, including any polymer, also referred to herein as a plastic.
  When the gradient and/or gradients are made by the use of plastics, other polymers, biological material, oils, and/or any other solid and/or liquid and/or solid/liquid combination.
  When plastic or plastics are used to provide for a carbon source for carbonization of any kind, and/or nitrogen is used to provide for nitriding of any kind, and/or oxygen source to support formation of carbon monoxide in conjunction with the carbon source.
    When alumina particles may be added to the carbon layer, including the addiction of any amount of alumina particles about 0.05 micron in diameter.
    When any other material, chemical, in any form, is added to the said plastic.
    With any ratio of atomic makeup of the said Chemical(s), including any, in any combination or alone, from the non-limiting example list that includes: polyimides, polyacrylonitriles, polyamides, phenol-formaldehydes, polyesters, poly-p-phynylene-2,6-benzobisoxazoles, polytetrafluoroethylenes, polyurethanes, and any and all organic polymers in any concentration, formulation, and/or combination.
    With any polymer, including all plastics, by way of nonlimiting example from the list that includes: nylon, polyethylene, polypropylene, polyisobutylene, polystyrene, polyacrylonitrile, polyvinyl chloride, acrylonitrile, acrylonitrile's, poly(2,5 pyridine), poly(3,5 pyridine), DNA, RNA, proteins, cellulose, hemicellulose, lignin, starch, pectin, and all other polymers.
    With any chemical of any kind.
    With any of the brand name compounds that include by way of non-limiting examples: Bakelite, Kevlar, Tarpon, Mylar, Neoprene, Nylon, Nomex, Orlon, Risen, Technocrat, Teflon, Ultimo, Vectren, Viton, Zygon, or any other brand compounds of chemical, chemicals.
    With any of the above, or different material, that comes from waste material(s), including waste plastics, waste nonplastics, industrial waste, household waste, waste cellulosics such as waste paper, waste sawdust and/or any other waste or waste-like cellulose containing material or materials.
    With any wax that includes biological waxes and petrochemical waxes and/or combinations thereof.
    With any material generally associated with the production of any layer sizes of material in contact to surfaces, by way of nonlimiting examples from the example list that includes ethylene glycol monomethyl ester, ethylene glycol, ethylene oxide, tackifiers of any kind, product WD-40, motor oils of any kind.

All forms of extrusion and other metal material shaping, production, enhancing, and processing methods are valid for creating the internal gradients. By way of nonlimiting example, an extruder and/or roller may be used to make a wire, or rod, with additives in the center line, thus providing for self-sharpening points for needles and/or fishhooks for example. Regarding Maintenance, self sharpening includes maintaining the self-sharpening ability, where the sharpness may fluctuate, but will remain at a common and acceptable sharpness during and through appropriate challenges. Regarding statis, self-sharpening includes, if the material is over-sharpened, dulling to an engineered sharpness, then remaining at that sharpness, or "finding it's edge profile." Essentially, the sharpness afforded by the internal gradient in conjunction with the challenge will come to a sharpness stasis.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the implements illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art after reviewing the present disclosure and are within the following claims.

What is claimed is:

1. An implement comprising a first plate and a second plate, each plate having a contact surface which abuts a contact surface of the other plate to establish an interface plane, and a gradient of at least one additive that is more concentrated at the interface plane and less concentrated in decreasing amounts progressing away from the interface plane and the contact surface for each plate, wherein the at least one additive alters at least one property of each plate, wherein at least one of the first plate and the second plate is formed of a metallic material, wherein the interface plane has an outer boundary and the implement includes at least one working edge along at least a portion of the outer boundary of the interface plane, wherein the at least one additive increases hardness of the first and second plates, and the working edge is self-sharpening during use of the implement.

2. The implement of claim 1 wherein each of the first plate and the second plate is formed of a metallic material.

3. A method of making an implement comprising:
selecting a first plate and a second plate, each plate having a contact surface, and at least one of the first plate and the second plate being formed of a metallic material;
placing at least one additive on at least one of the contact surfaces;
bringing the contact surfaces together;
applying pressure to force the first plate and the second plate against each other; and
applying at least one type of energy to the first plate and the second plate to fuse the plates together and to establish an interface plane at the contact surfaces with a gradient of the at least one additive that is more concentrated at the interface plane and less concentrated in decreasing amounts progressing away from the interface plane and the contact surface for each plate, wherein the contact surfaces abut each other and the at least one additive alters at least one property of each plate, wherein the interface plane has an outer boundary and the implement includes at least one working edge along at least a portion of the outer boundary of the interface plane, wherein the at least one additive increases hardness of the first and second plates, and the working edge is self-sharpening during use of the implement.

4. The method of claim 3 wherein at least thermal energy is applied to the first plate and the second plate.

5. The method of claim 3 wherein plates are pre-formed into a selected implement shape prior to establishing the interface plane with gradient.

6. The method of claim 3 further including fashioning the fused plates into a selected implement.

7. The method of claim 3 wherein each of the first plate and the second plate is formed of a metallic material.

8. A material formed to have an internal gradient, the material comprising a first portion and a second portion, each portion having a contact surface which abuts a contact surface of the other portion to establish an interface plane, and a gradient of at least one additive that is more concentrated at the interface plane and less concentrated in decreasing amounts progressing away from the interface plane and the contact surface for each portion, wherein the at least one additive alters at least one property of each portion, wherein at least one of the first portion and the second portion is formed of a metallic material, wherein the interface plane has an outer boundary and the material includes at least one working edge along at least a portion of the outer boundary of the interface plane, and wherein the at least one additive increases hardness of the first and second portions, and the working edge is self-sharpening during use of the material.

9. The material of claim 8 wherein each of the first portion and the second portion is formed of a metallic material.

10. The material of claim 8 wherein the contact surfaces of the first portion and the second portion oppose each other in a center of a metallic cylindrical solid with a radial internal gradient.

11. The method of claim 3 wherein, after placing the at least one additive on at least one of the contact surfaces and bringing the contact surfaces together, edges of the plates are sealed to form a sealed cavity containing the at least one additive.

12. The implement of claim 1 wherein the at least one additive includes at least one steel property modifier.

13. The method of claim 3 wherein the at least one additive includes at least one steel property modifier.

14. The material of claim 8 wherein the at least one additive includes at least one steel property modifier.

15. An implement comprising a first plate and a second plate, each plate having a contact surface which abuts a contact surface of the other plate to establish an interface plane, and a gradient of at least one additive that is more concentrated at the interface plane and less concentrated in decreasing amounts progressing away from the interface plane and the contact surface for each plate, wherein the at least one additive alters at least one property of each plate, wherein at least one of the first plate and the second plate is formed of a metallic material, wherein the interface plane has an outer boundary and the implement includes at least one working edge along at least a portion of the outer boundary of the interface plane, and wherein the at least one additive increases corrosion resistance of the first and second plates to a corrosive fluid, and the working edge is self-sharpening during immersion of the implement in the corrosive fluid.

16. The implement of claim 15 wherein each of the first plate and the second plate is formed of a metallic material.

* * * * *